Sept. 23, 1969  J. W. NEWMAN  3,468,110
HARVESTING MACHINE
Filed May 31, 1966  2 Sheets-Sheet 1

INVENTOR
JOSEPH W. NEWMAN

BY Irons, Birch, Swindler & McKie
ATTORNEY

United States Patent Office 3,468,110
Patented Sept. 23, 1969

3,468,110
HARVESTING MACHINE
Joseph W. Newman, 351 Azalea Road, Apt. D26,
Mobile, Ala. 36609
Filed May 31, 1966, Ser. No. 554,114
Int. Cl. A01g *19/08*
U.S. Cl. 56—328                    13 Claims

ABSTRACT OF THE DISCLOSURE

A harvesting device for removing fruit, berries, and the like from trees, vines and bushes. A plurality of hollow head members arranged in horizontal rows defining a generally concave boundary conforming to the perimeter of a tree are advanced toward the articles to be picked. Each hollow head is provided with a source of vacuum and is connected to a hollow receiving member with a flexible coupling means, such as a plastic bellows. A semi-annular collar spans the flexible coupling means, said collar being provided with a source of pressurized fluid. After the article being picked has entered the hollow head by reason of the vacuum, the pressurized fluid is applied to the collar to flex the head member in a direction transverse to its longitudinal axis to snap the article being picked from its limb or vine.

---

This invention relates to harvesting devices and more particularly to harvesting devices employing one or more vacuum-operated units movable into and out of engagement with a tree, vine, bush or the like.

In harvesting fruit such as oranges, apples, peaches, plums, pears, berries and the like, it has heretofore been the usual practice to pick the fruit by hand or by relatively simple mechanical means capable of picking only one or two pieces of fruit at a given time. Moreover, although many attempts have been made to devise harvesting machines capable of picking a larger quantity of fruit or other products at a given time, such machines have not proven satisfactory. All known prior art machines have either been inefficient or have damaged the product or the tree, vine or bush bearing the objects to be harvested.

In particular, it is necessary to handle ripe fruit with great care since even the slightest bruise or injury often results in subsequent spoilage, and/or lowering the grade of the fruit. In particular, with citrus fruit and apples, the fruit should be removed from the stem or the stem from the fruit spine by a snapping or flexing action rather than by a pulling or twisting action in order to avoid damage. The heretofore known automatic fruit-picking machines have not been able to adequately solve the problem of picking the fruit from the tree without bruising, tearing of the skin, or otherwise causing injury which results in spoilage or a lowering in grade.

To overcome the disadvantages of the prior art harvesting apparatus, it is an object of the present invention to provide an improved harvesting device which is capable of automatically and efficiently harvesting objects from a tree, vine, bush, or the like without damage.

Another object of the invention is to provide a harvesting device which is capable of picking fruit without damaging the tree.

A further object of the invention is to provide an improved harvesting device which is capable of removing the fruit from a substantial portion of the tree while maintaining the device in one fixed position with respect to the tree.

Another object of the invention is to provide such a harvesting device employing vacuum-operated harvesting units which permit more efficient picking of the tree while substantially reducing the possibility of damaging the fruit or the tree.

Still another object of the invention is to provide an improved harvesting device which is relatively simple in construction and which may be readily operated by a single operator.

In general, the invention relates to a harvesting device comprising a hollow head member adapted to engage the objects to be harvested, a hollow receiving member for receiving the harvested objects, hollow flexible coupling means connecting the head member to the receiving member in communication relationship, vacuum means to reduce the pressure in the head member, and means for flexing the head member in a direction transverse to its longitudinal axis when in normal position to apply a snapping action to the object to be harvested.

In a preferred embodiment, the leading end of the head member is covered by a resilient, stretchable, generally centrally orificed cap or diaphragm member which initially engages the object to be harvested. The object to be harvested is received into the head member through the stretchable orifice, and the object removed from its support by the flexing action of the head member.

In one embodiment of the harvesting device of the invention a plurality of units such as those just described may be mounted on a horizontally and vertically movable frame or support in aligned relationship in at least one row defining a generally concave boundary adapted to conform to the perimeter of a tree. In a further embodiment, the individual units may be mounted to the support member by a yieldable connection means whereby any one of said units may stop upon engagement with an obstruction without stopping the remainder of said units as the row of units is moved forward into penetrating engagement with the tree. Thus, limb breakage or other injury to the tree structure readily may be avoided.

In another embodiment, the individual harvesting units are provided with means to pneumatically remove foliage and small limbs from the path of the unit as it penetrates from the periphery to the interior of the tree.

All of the single or groups of harvesting units may be provided with suitable means for delivery of the fruit to a collection area.

The invention having been generally described, more specific embodiments thereof now will be set forth in detail with reference to the accompanying drawings in which.

Figure 1:
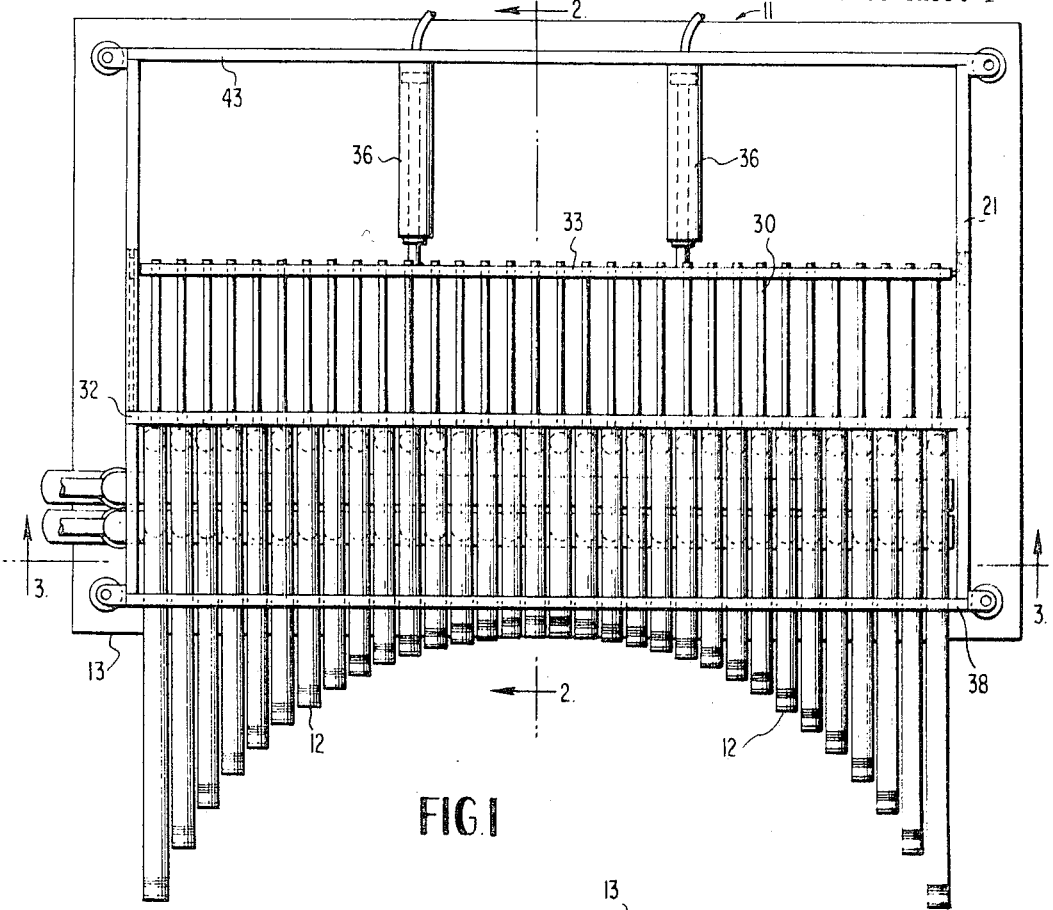
FIG. 1 is a top plan view of an automatic harvesting device designed primarily for picking citrus fruits, apples, pears, peaches, plums and the like, according to the present invention.

Illustrated in the drawings is an automatic harvesting device 11 comprised of a plurality of hollow harvesting units 12 mounted on a vertically adjustable platform or support 21 on a suitable base frame 13. It will be understood that the frame 13 may be a part of or may be mounted on any suitable vehicle such as a trailer or a truck.

Figure 4:
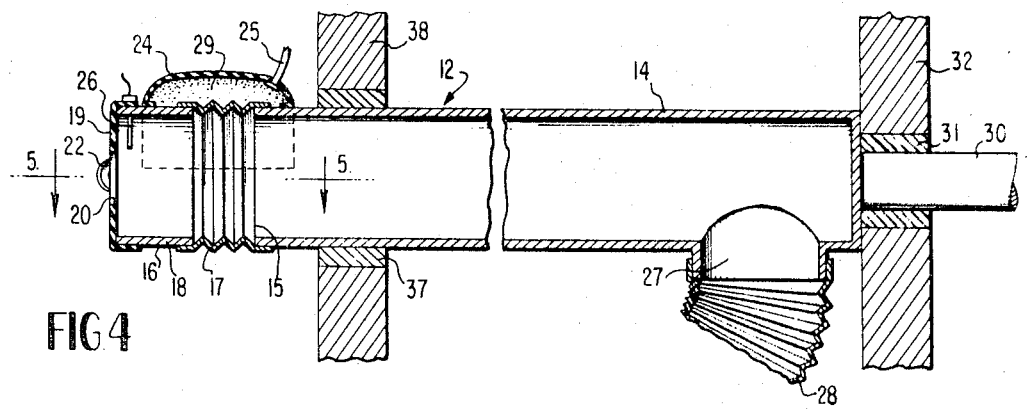
FIG. 4 is a cross-sectional view of one of the individual harvesting units on an enlarged scale.

Each of the individual harvesting units is comprised of a tubular receiving member 14 open at its outer end 15 and a harvesting or fruit-engaging head member 16 as shown in FIG. 4. The head member 16 is movably connected to the outer end of the receiving member 14 by means of a flexible coupling member 17. The flexible coupling member 17 may be constructed of any suitable resilient material such as plastic, corrugated metal tubing and the like, and preferably is in the form of a bellows to permit ease of flexibility of the head member 16 with respect to the receiving member 14.

Figures 5, 6:
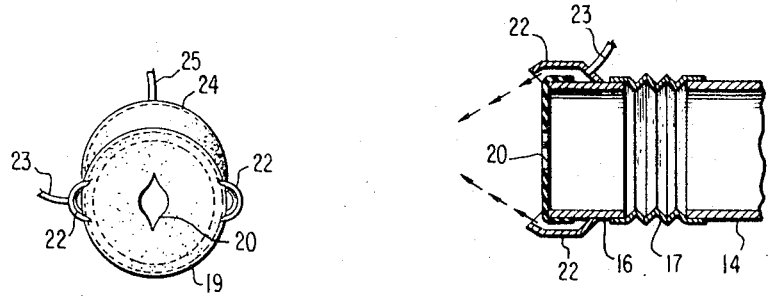
FIG. 5 is a cross-sectional view taken along line 5–5 of FIG. 4.
FIG. 6 is an end view of one of the individual harvesting units showing the apertured cap covering the end of the unit.

The fruit-engaging head 16 shown comprises an annular ring 18 provided with a resilient apertured cap or diaphragm 19 on its outer end. The cap 19 is provided with generally centered, stretchable aperture 20 preferably having an unextended dimension smaller than the smallest object it is desired to harvest. The cap 19 may be constructed of any suitable elastomeric or resilient material, such as rubber or plastic which will permit it to stretch around any fruit or other object to be harvested which passes through the aperture 20. The ring 18 as well as the tubular receiving member 14 preferably are both cylindrical in contour and slightly larger in diameter than the largest fruit or other object to be picked. The head member 16 also may be provided with one or more air vents 22 located adjacent the front end on the periphery thereof for deflecting foliage and small limbs away from the fruit-engaging end of the head during a harvesting operation. Such construction further minimizes tree damage and substantially eliminates the possibility of admixture of undesirable matter with the fruit. The vents 22 may be connected to any suitable source of air pressure by means of a suitable pressure hose 23 as shown in FIGS. 5 and 6.

The head member 16 normally is maintained in axial alignment with the receiving member 14 by a semi-annular collar 24 which spans the flexible coupling member 17. The collar 24 is hermetically sealed at one end to the receiving member 14 and at the other end to the head member 16 to define a semi-annular pressure chamber 29 therein. The collar 24 may be connected to any suitable source of fluid pressure by means of a suitable pressure hose 25 as shown in FIG. 4. The pressure chamber 29 is adapted to cause the head member 16 to flex when a piece of fruit enters the head through aperture 20 in the cap 19. In the specific embodiment shown, the source of fluid pressure connected to collar 24 is automatically activated by any suitable control means such as a flexible control finger 26 mounted within the head member 16. The control finger 26 is physically activated by engagement of the fruit and its passage into the head member 16. It is apparent that when air pressure is applied to the pressure chamber 29, the force of the fluid acting against the head member 16 will cause it to flex in a direction transverse to its longitudinal axis and impart a snapping action to the fruit in order to effectively pick it from a limb of a tree without damage of the fruit. This snapping action may be applied in any direction desired and is to be distinguished from a twisting or pulling action. Thus, when the harvester of the invention is employed to harvest citrus fruit, peaches, plums, and the like, the skin is not damaged at the point where the fruit is attached to the stem; when employed to harvest apples, pears and the like, the stems are cleanly snapped at their adhesion points to the fruit spurs.

The inner end of member 14 is provided with a discharge outlet 27 on its lower side to permit fruit picked by the head member 16 and carried through the receiving member 14 to be discharged to any suitable collecting means. The discharge outlet 27 further may be connected to a flexible hose or conduit 28 which in turn is connected to a suitable header as subsequently described.

In one embodiment of the invention, the harvesting units 12 preferably are mounted on the movable platform or support 21 in aligned relationship in one or more rows defining a generally concave or semi-circular boundary adapted to conform to one-half of the perimeter of a tree as shown in FIG. 1. Although any number of rows may be employed as desired, in the emodiment of the invention disclosed in the drawing, three of such rows are provided in parallel relationship vertically displaced from one another.

The movable support 21, adjustably connected to the base frame 13, is generally comprised of a suitably apertured front wall 38, a fixed, and suitably apertured intermediate wall 32 and a suitably apertured back wall 43 connected together by suitable framing members. Positioned between intermediate wall 32 and back wall 43 is a suitably apertured, horizontally adjustable wall 33 to be described more fully hereinafter in connection with the manner in which the hollow harvesting units 12 are mounted on the support 21.

Figure 2:
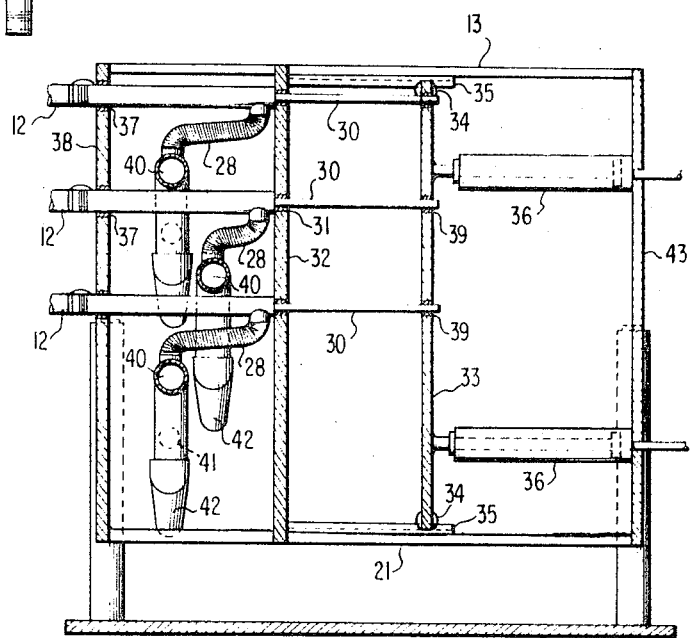
FIG. 2 is a cross-sectional view taken along line 2–2 of the harvesting device shown in FIG. 1.

The front end of each of the tubular members 14 is slidably received and supported within a suitable bearing 37 mounted in the front wall 38 as shown in FIGS. 2 and 4. The back ends of the tubular members 14 are fixedly connected to shafts 30 slidably received and supported at their front ends within suitable bearings 31 mounted in the apertured intermediate wall 32. The rear ends of the shafts 30 are supported within suitable slips or friction connections 39 mounted in the apertured movable wall 33. As best shown in FIG. 2, the movable wall 33 is supported at its upper and lower ends by wheel members 34 movable along tracks 35 attached to the support 21. The wall 33, and consequently all of the harvesting units 12 connected thereto, may be moved horizontally by any suitable power means such as hydraulic cylinders 36 attached at one end to the wall 33 and at the other end to wall 43. The slip connections 39 permit any one of the harvesting units 12 to stop upon engagement with an obstruction such as a tree limb without stopping any of the other units as they are moved forward by hydraulic cylinders 36.

Figure 3:
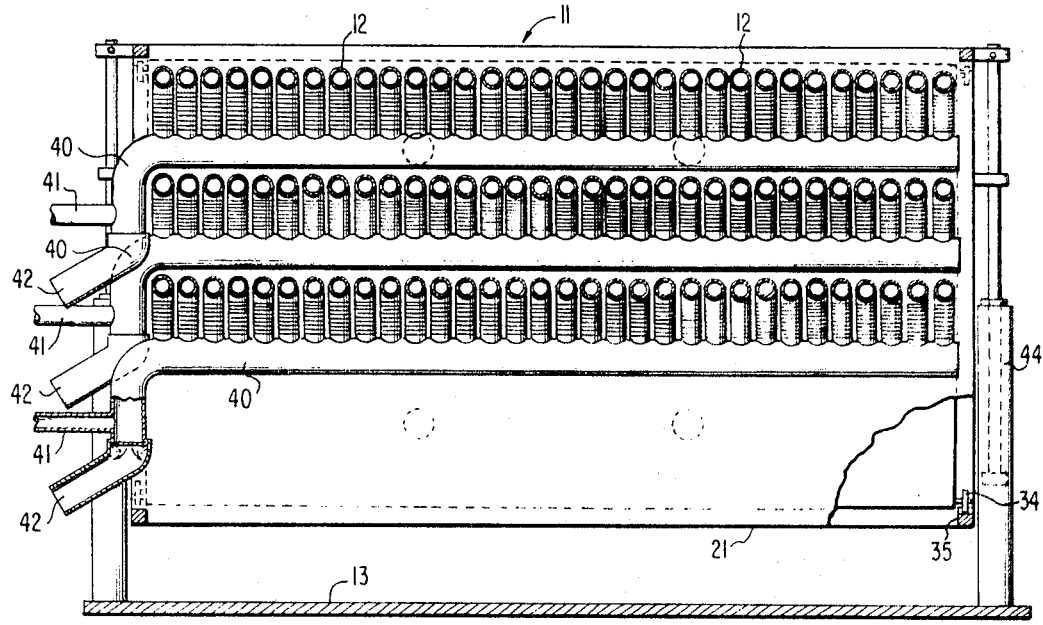
FIG. 3 is a view taken along line 3–3 of FIG. 1.

The entire support 21 and, consequently, the rows of harvesting units 12 attached thereto may be vertically adjusted by any suitable power means such a hydraulic cylinders 44 attached at one end to the upper portion of the support 21 and at the other end to a portion of the frame 13 as shown in FIG. 3.

In the apparatus shown, an elongated vacuum header 40 is provided for each row of harvesting units 12. Each of the headers 40 is connected to each of the harvesting units 12 in the respective rows by means of the flexible conduits 28. Each header 40 not only constitutes a means for supplying a vacuum to each of the harvesting units, but also provides a passageway for discharging the fruit picked from a tree to a suitable collection point. In this connection, each header 40 preferably is slightly inclined towards one end to facilitate rolling movement of the fruit to the discharge end of the header. Each header is connected to a suitable source of vacuum at its discharge end by any suitable connection such as pipe 41. Moreover, the discharge end of each header may be provided with a discharge chute 42 leading to any suitable collection means.

If desired, vacuum can be separately or simultaneously applied to each individual member 14, to each head member 16 or to each header 40 depending on the particular use to which the apparatus is directed. In each picking operation, it is necessary that sufficient differential be provided between the outside atmospheric pressure and the pressure within head member 16 to cause the fruit engaging the cap 19 to pass through aperture 20 into the interior of the head member 16.

In operation of the harvesting device of the present invention, the device is positioned adjacent a tree, bush, or the like from which it is desired to pick objects such as fruit. The movable support 21 is then vertically adjusted to the proper height by means of hydraulic cylinders 44 and, by means of hydraulic cylinders 36, is subsequently moved forward into penetrating engagement with a portion of the tree to be picked. As the support 21 is moved forward, the head member 16 of each of the individual harvesting units 12 come into contact with the fruit on the tree whereupon the fruit is caused to pass into the head member 16 through the aperture 20 of the flexible cap 19 as a result of the reduced presure within the head. More specifically, as the head engages the fruit, the aperture 20 is blocked and the flow of air entering therethrough is substantiallly reduced, thus creating the necessary pressure differential. As soon as the fruit passes through the aperture, air again is permitted to enter therethrough and the vacuum or suction within the tubular member 14 is substantially reduced. Depending on the particular design of the apparatus, the reduction of pressure differential eliminates the tendency of the fruit to accelerate to undesirable speed, thus preventing injury to the fruit.

In the embodiment shown, as the fruit passes through the aperture 20, it engages control means 26 which activates a suitable control mechanism to cause fluid pressure to be introduced into pressure chamber 29 formed by collar 24. The introduction of the fluid pressure into pressure chamber 29 causes the head 16 to flex downwardly and impart a snapping action to the fruit in order that it may be properly severed without injury. As soon as the head member 16 has been flexed, the pressure within chamber 29 is released and the head resumes its normal position as a result of the action of the resilient coupling 17 connecting the head to the tubular member 14 or any equivalent actuating means. Upon leading the head member 16, the fruit then travels through tubular member 14 to discharge outlet 27, whereupon it is discharged to the header 40. It is to be noted that, in the embodiment illustrated, each header 40 is located just below each of the row of fruit-picking units to eliminate the possibility of the fruit being bruised by dropping through a substantial vertical distance. Moreover, each header 40 is slightly inclined toward its discharge end so that the fruit may gently roll through the header to a suitable collection means located at the discharge end thereof.

The support 21 and consequently the fruit-picking units 12 may be stepped through a series of successive vertical displacements and the rows of fruit-picking units reciprocated back and forth in the manner described until the entire surface of one side of the tree has been picked. The operation thereupon may be repeated for the opposite side of the tree. If desired, an array of picking units may be employed which will cover the entire height of the tree in a single penetrating engagement.

It is apparent that the harvesting device of the present invention affords many significant advantages. In particular, a unique manner of flexing the head of each unit is provided whereby a snapping action is imparted to the fruit to remove it from the stem or the stem from the tree without causing injury to the fruit. Moreover, the device is provided with a yieldable connection means, such as slip means 39, individually connecting each of the units to the movable wall 33 of support 21 whereby any one of the units may stop upon engagement with an obstruction without stopping the remainder of the units as they are moved forward into engagement with the tree. In its preferred embodiment, the device is provided with collection means, including the headers 40, which are located just beneath the fruit-picking units 12 so that the fruit is not required to fall through a substantial vertical distance, thus preventing undesirable damage to the fruit after it has been picked.

Another significant advantage resides in the use of air vents mounted on the periphery of the head members 16 of each unit to prevent undesirable foliage and small limbs from entering the unit along with the fruit. Further, the picking units may be arranged in one or more rows defining a concave or semi-circular boundary adapted to conform to the perimeter of the tree so that the units may be readily moved into and out of engagement with the tree in order to engage a substantial peripheral portion of the tree without having to move the position of the fruit-picking device with respect to the tree.

Although the present invention has been illustrated and described with reference to a specific embodiment, it will be understood that various modifications may be made by persons skilled in the art without departing from the spirit of the invention. For example, the header member 16 may be automatically flexed at desired brief intervals instead of being actuated by passage of an object passing through the orifice 20. Additionally, the flexing action itself may be imparted by equivalent mechanical means instead of the specific pressure-actuated means 24. The means for removing the fruit from the tubular member 14 and conveying it to a point of collection likewise may be designed to the particular harvesting application. Accordingly, it is intended that the invention be limited solely by the scope of the appended claims.

What is claimed is:

1. A harvesting device comprising
   a hollow head member adapted to engage an object to be harvested;
   a hollow receiving member for receiving the harvested object;
   hollow, flexible coupling means connecting said head member to said receiving member in communicating relationship;
   vacuum means to reduce the pressure in said head member; and
   power operated means for flexing said head member in a direction transverse to its longitudinal axis when in normal position, to apply a snapping action to the object to be harvested.

2. A harvesting device as defined in claim 1 which includes a resilient apertured cap on the outer end of said head member for engaging the object to be harvested.

3. A harvesting device as defined in claim 1 which includes vent means connected to a source of air pressure adjacent the outer end of said head member for deflecting foliage away from said head member during a harvesting operation.

4. A harvesting device as defined in claim 1 wherein said means for flexing said head member comprises a pressure chamber spanning said coupling means and connected to a source of fluid pressure.

5. A harvesting device as defined in claim 1 wherein said means for flexing said head member includes control means within said head member activable by an object entering therein to automatically cause said head member to flex.

6. A harvesting device comprising
   a hollow head member adapted to engage an object to be harvested;
   a hollow receiving member for receiving the harvested object;
   hollow, flexible coupling means connecting said head member to said receiving member in communicating relationship;
   a resilient apertured cap on the outer end of said head member for engaging an object to be harvested,
   vacuum means to reduce the pressure in said head member; and
   means for flexing said head member in a direction transverse to its longitudinal axis when in normal position, to apply a snapping action to the object to be harvested, said means for flexing said head member comprising a pressure chamber connected to a source of fluid pressure spanning said coupling means.

7. A harvesting device as defined in claim 6 which includes vent means connected to a source of air pressure adjacent the outer end of said head member for deflecting foliage away from said head during a fruit-picking operation.

8. A harvesting device as defined in claim 6 wherein said means for flexing said head member includes control means within said head member activable by an object entering therein to automatically cause said head member to flex.

9. A harvesting device comprising
a support,
a plurality of hollow harvesting units mounted on said support;
said units being mounted in aligned relationship in at least one row defining a generally concave boundary adapted to conform to the perimeter of a tree;
means for moving said row of fruit-picking units into and out of engagement with the tree;
slip connection means individually connecting each of said units to said support whereby any one of said units may stop upon engagement with an obstruction without stopping the remainder of said units as said row of units is moved forward into engagement with the tree; and
a vacuum source connected to each of said units for reducing the pressure therein.

10. A harvesting device as defined in claim 9 wherein said row is in a horizontal position and said row moving means is capable of moving said row both horizontally and vertically.

11. A harvesting device as defined in claim 9 wherein each of said harvesting units comprises
a hollow head member adapted to engage an object to be harvested;
a hollow receiving member for receiving the harvested object;
hollow, flexible coupling means connecting said head member to said receiving member in communicating relationship; and
means for flexing said head member in a direction transverse to its longitudinal axis when in normal position, to apply a snapping action to the object to be harvested.

12. A harvesting device as defined in claim 11 wherein said means for flexing said head member comprises a pressure chamber spanning said coupling member and connected to a source of fluid pressure.

13. A harvesting device as defined in claim 11 wherein said means for flexing said head member includes control means within said head activable by an object to be harvested entering therein to automatically cause said head member to flex.

References Cited

UNITED STATES PATENTS

| | | | |
|---|---|---|---|
| 858,371 | 7/1907 | Corley | 56—30 |
| 1,707,010 | 3/1929 | Herrmann | 56—32 |
| 2,545,072 | 3/1951 | Denman | 56—332 |
| 3,200,575 | 8/1965 | Hurst | 56—328 |
| 3,303,638 | 2/1967 | Koehn | 56—330 |

RUSSELL R. KINSEY, Primary Examiner

U.S. Cl. X.R.

56—32